United States Patent

[11] 3,595,029

| [72] | Inventor | Henry W. Lende, Jr.<br>San Antonio, Tex. |
|---|---|---|
| [21] | Appl. No. | 855,989 |
| [22] | Filed | Sept. 8, 1969 |
| [45] | Patented | July 27, 1971 |
| [73] | Assignee | Heatransfer Corporation<br>San Antonio, Tex.<br>Continuation-in-part of application Ser. No. 794,714, Jan. 28, 1969. |

[54] AIR CONDITIONING FOR VOLKSWAGEN-TYPE AUTOMOBILES
3 Claims, 11 Drawing Figs.

[52] U.S. Cl. ............................................. 62/244,
62/243, 165/42, 62/299, 62/324, 62/507, 62/241
[51] Int. Cl. ............................................. B60h 3/04
[50] Field of Search ............................................. 62/243,
244, 299; 165/42

[56] References Cited
UNITED STATES PATENTS

| 2,479,170 | 8/1949 | Kuempel | 62/230 |
|---|---|---|---|
| 2,771,750 | 11/1956 | Oldberg | 62/239 |
| 2,804,756 | 9/1957 | Faulhaber | 62/243 |
| 2,919,907 | 1/1960 | Simons | 62/244 |
| 3,066,497 | 12/1962 | Dubberley | 62/299 |
| 2,180,760 | 11/1939 | Mayo | 62/243 |
| 2,344,864 | 3/1944 | Griswold | 62/243 |
| 2,989,854 | 6/1961 | Gould | 62/244 |
| 3,091,943 | 6/1963 | Plegat | 62/243 |
| 3,096,938 | 7/1963 | Cole | 62/244 |
| 3,381,493 | 5/1968 | Dixon | 62/244 |
| 3,426,549 | 2/1969 | Bardong | 62/244 |
| 3,449,924 | 6/1969 | Sudmeier | 62/244 |

*Primary Examiner*—William J. Wye
*Attorneys*—Frank B. Pugsley, Bertram H. Mann, Delmar L. Sroufe and Larry B. Feldcamp

ABSTRACT: Air-conditioning apparatus particularly adapted for small cars of the Volkswagen type and comprising an encased condenser and evaporator forming a reversible heat exchange unit of the heat pump type which may be conveniently stowed in the space behind the rear seat and which directs heated or cooled air forwardly along the interior roofline, then reversely through the passenger space. The limited space beneath the dashboard, therefore, is unencumbered by the evaporator and control units as heretofore and air circulation is improved, while installation is facilitated.

PATENTED JUL 27 1971

Henry W. Lende, Jr.
INVENTOR

BY Bertram H. Munn
ATTORNEY

Henry W. Lende, Jr.
INVENTOR.

BY Bertram H Mann
ATTORNEY 3,595,029

AIR CONDITIONING FOR VOLKSWAGEN-TYPE AUTOMOBILES

RELATED APPLICATION

This application is a continuation-in-part of my copending application Ser. No. 794,714 filed Jan. 28, 1969.

BACKGROUND OF THE INVENTION

1. Field of the Invention

This invention relates to air-conditioning equipment of the mechanical type particularly adapted for installation in small or compact automotive vehicles, for instance, the Volkswagen passenger vehicle of the "bug" type.

2. Description of the Prior Art

Such equipment heretofore provided for these vehicles usually has involved the mounting of at least a part of the equipment, such as the evaporator coil and blower, in the already congested space in the front compartment of the vehicle beneath the dashboard. Such positioning not only utilizes space needed for the control pedals and the feet and legs of occupants of the front seats, but tends to restrict the circulation of conditioned air to the front seat area, little or none of this air reaching the rear seat area. Furthermore, installation of previous units of this type has been quite complicated due to the very limited spaces available in the engine compartment and elsewhere. Thus, considerable time and expense is necessitated in installing these previous air conditioners in the Volkswagen cars, in properly charging the units with heat exchange fluid, and in making the electrical and fluid connections.

SUMMARY OF THE INVENTION

Accordingly, an object of the present invention is to provide a very much improved and simplified air conditioning unit which is especially adapted for installation in Volkswagen-type compact cars.

Another object is to provide such air-conditioning equipment in which major portions are mounted in an encased unit which can be neatly stowed in a compartment provided between the back of the rear seat and the engine compartment, only the control switches and compressor and their connections being mounted outside this unit.

Another object is to provide such air-conditioning apparatus which can be accurately precharged at the factory or by the installing mechanic prior to installation in the automobile.

Another object is to provide air-conditioning apparatus of the above type which does not require utilization of the already congested space beneath the dashboard.

Another object is to provide such air-conditioning apparatus in which all condensers, hoses, and wiring are removed from vulnerable positions under the vehicle to eliminate road damage while improving performance.

Still another object is to provide a heat pump type of air conditioner for motor vehicles having a more efficient heating mode than previous equipment of this type.

In accordance with the present invention, a reversible evaporator-condenser unit, including necessary coils, valving, and blowers, is mounted compactly in a casing which fits in and rests on the slightly modified flooring in the compartment provided in the Volkswagen body just behind the rear seat. The control console is mounted on the flooring tunnel in convenient position for access by the driver and is connected to the evaporator-condenser motors and the source of electrical energy by means of suitable cabling which runs along the central tunnel in the flooring. The compressor is conveniently mounted on the rear engine, and a hose cluster connects the same to the evaporator-condenser unit. The hoses are provided with quick connect fittings of the type provided with check valves so that the evaporator-condenser unit can be safely precharged in the factory or at any time prior to installation.

BRIEF DESCRIPTION OF THE DRAWINGS

The above objects and others hereafter appearing are attained by means of the structures illustrated in the accompanying drawings in which:

FIG. 11 is an enlarged section illustrating the reversing valve.

DESCRIPTION OF THE PREFERRED EMBODIMENTS

Figure 1:
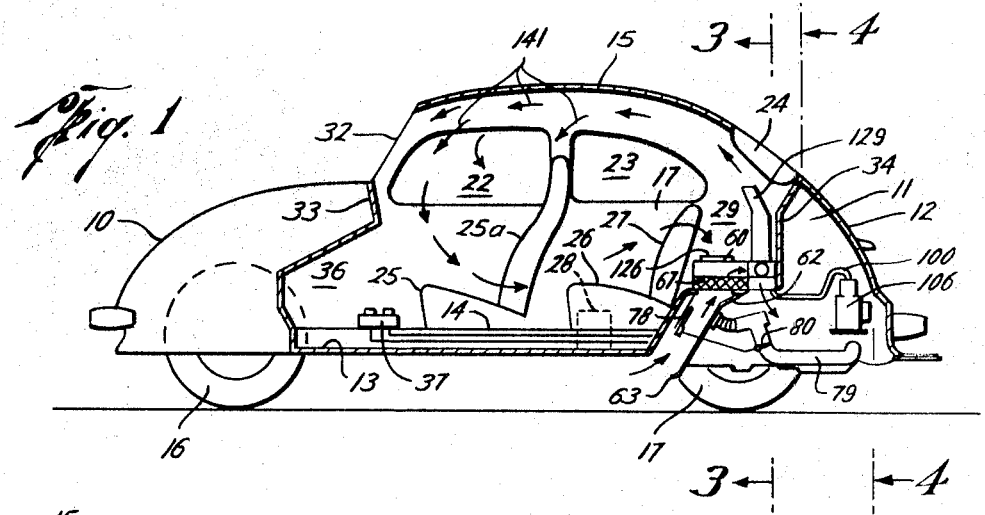
FIG. 1 is a schematic vertical longitudinal sectional view through a bug-type Volkswagen motor vehicle with the invention mounted therein.

FIGS. 1, 2, 3, and 4 illustrate a presently conventional compact motor car body of the Volkswagen bug-type including a forward hood 10 enclosing a luggage space, a rear-engine-mounting compartment, generally designated 11, with a hinged door 12, a floor 13 which may have a central longitudinal tunnel 14, and a roof 15 of generally streamline contour. The whole body is carried upon front and rear pairs of wheels 16 and 17 and framing, not shown.

The sidewalls 18 and 19 of the body terminate in fenders 20 and 21 and are provided with windows 22 and 23. A rear window 24 is provided at the rear end of roof 15 just above the engine space door 12. Mounted on the floor 13 are a front seat 25 having a back 25a and a rear seat 26 with a back 27. A space is provided under the rear seat for the storage battery 28. Just behind seat back 27 is a compartment 29 with an elevated floor 30 which, as shown in FIG. 7, may be corrugated or otherwise reinforced. Beneath flooring 30 there is a space 31 just forwardly of engine compartment 10 for the transmission which is connected through tunnel 14 to the usual shift lever adjacent the driver's seat, the transmission and its controls, as well as the engine, being omitted from FIG. 1 for clarity. The front wall of the car body is formed, in part, by the windshield 32 and instrument dashboard 33. An upstanding partition 34 forms the rear wall of the passenger space and separates the same from the engine compartment 11. The engine 35 (FIGS. 4 and 6) is mounted in rear compartment 11. The usual steering wheel and gearshift lever (not shown) are located in the forward compartment convenient for the driver. The space 36 beneath the dashboard receives the brake, clutch, and throttle pedals (not shown) and accommodates the legs and feet of the driver and passenger in the front seat. It is in this area that units of previous air-conditioning systems for this type of automobile have been located, for instance, the evaporator and blower, thus further restricting the space 36 in an undesirable manner and resulting in restricted circulation of cooled air. According to the present invention, as will be explained, the console 37 for air-conditioning controls is the only air-conditioning part located in the forward passenger compartment.

Figure 5:
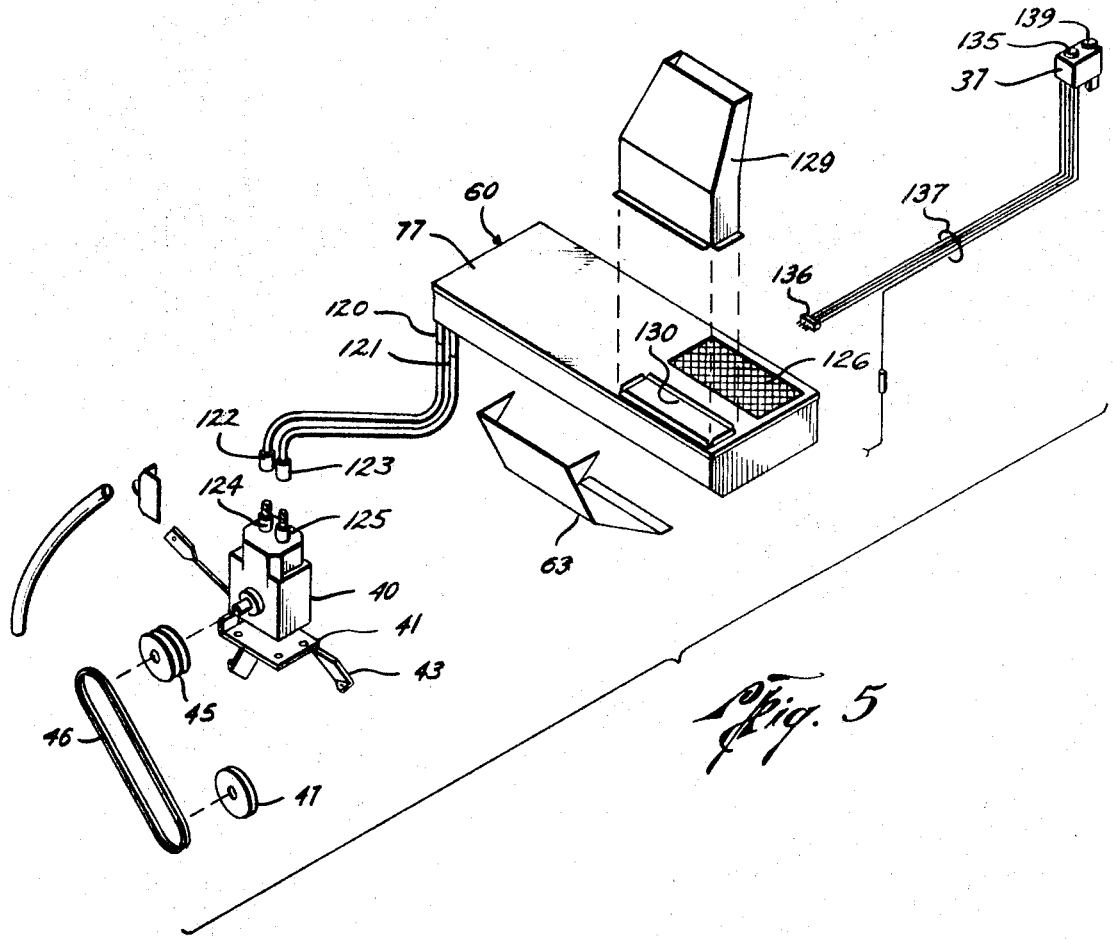
FIG. 5 is an exploded schematic view showing the various major units of the air-conditioning apparatus.
Figure 6:
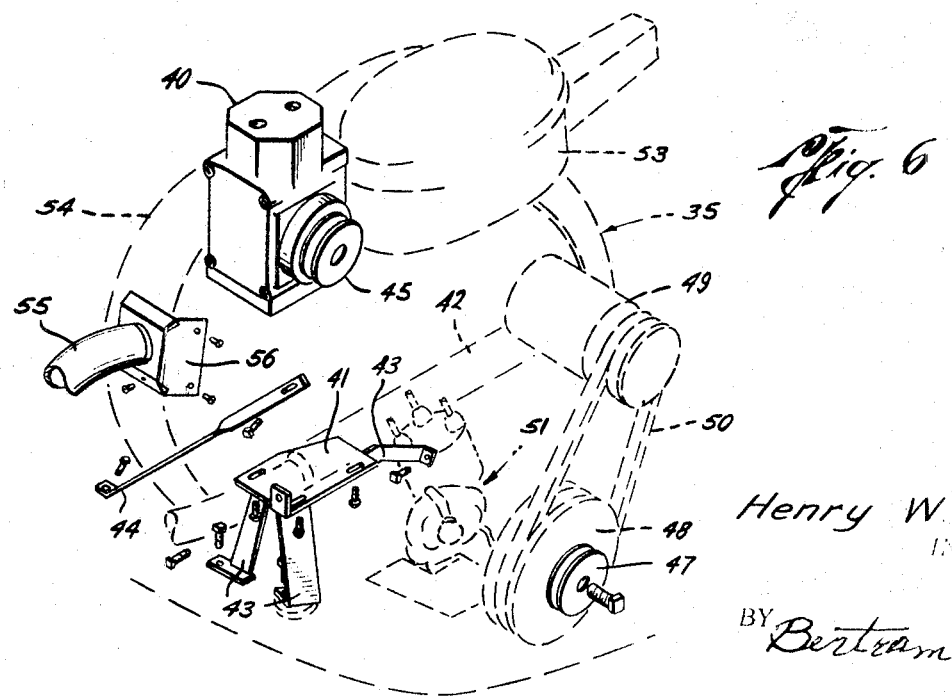
FIG. 6 is an exploded perspective view showing the compressor and its engine mounting.
Figure 7:
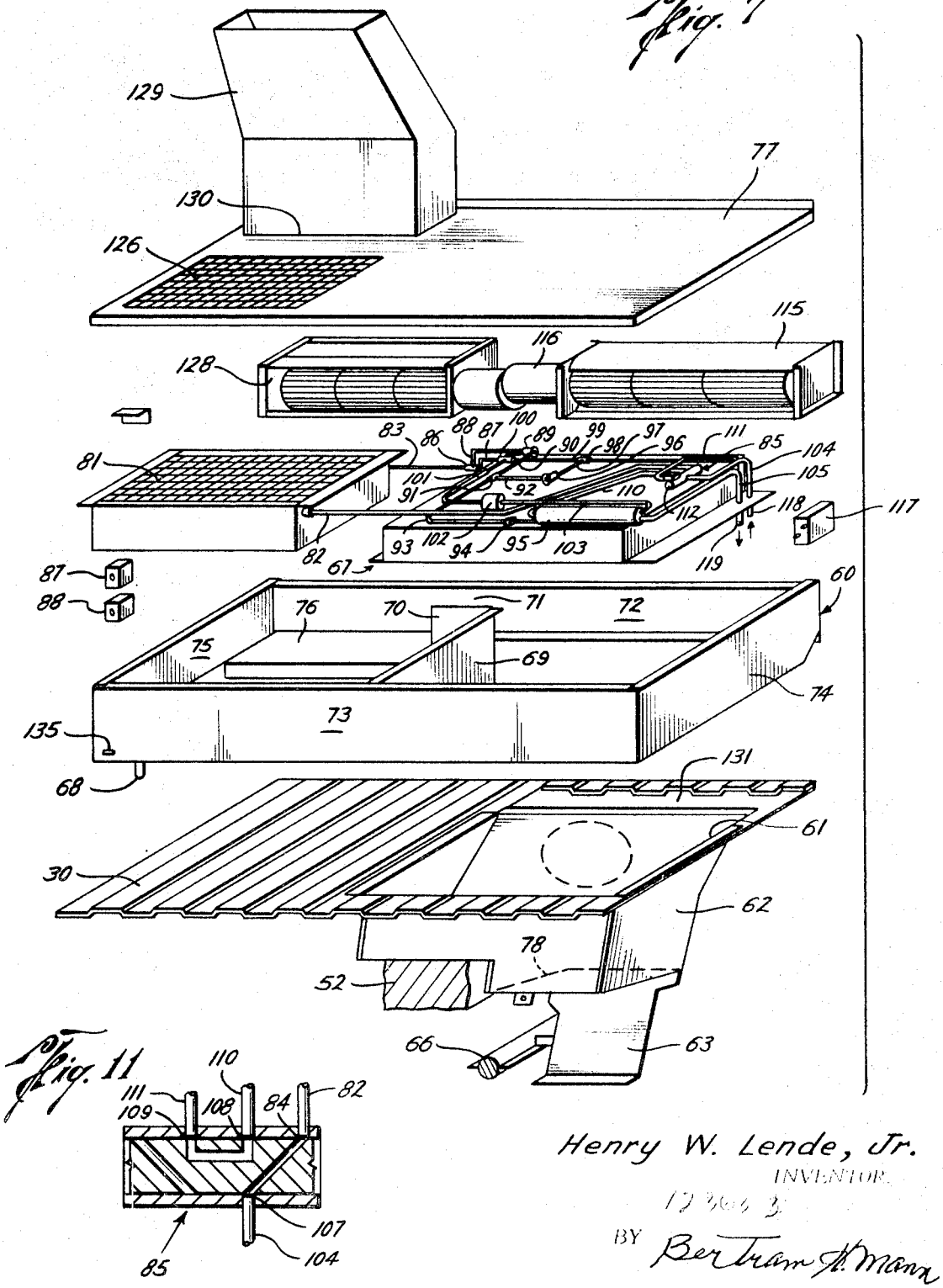
FIG. 7 is an enlarged exploded perspective showing the evaporator-condenser unit and modified flooring upon which it is mounted.
Figure 8:
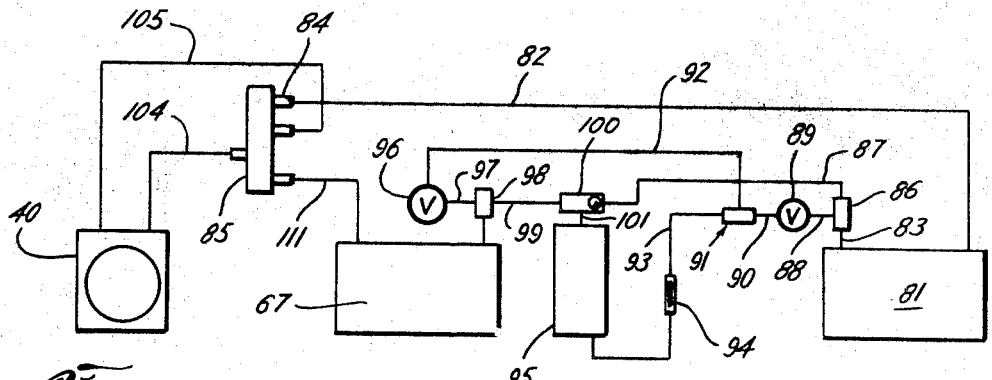
FIG. 8 is a diagram showing the various functional components of the heat pump apparatus.
Figure 9:
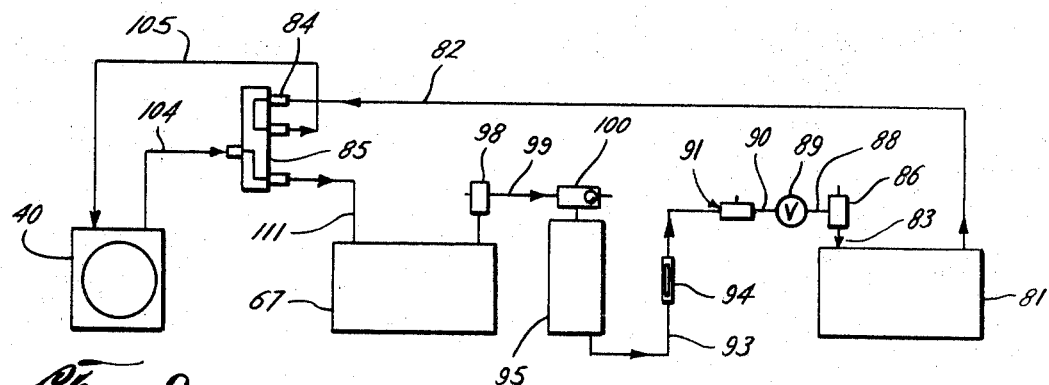
FIGS. 9 and 10 are similar diagrams, but showing, respectively, the cooling and heating configurations.

As shown in FIGS. 5 and 6, the compressor 40 is carried on a bracket plate 41 secured to and supported by legs 43. Additional support is provided by a brace 44. The compressor is provided with a clutch pulley, generally designated 45, and is driven by means of a belt 46 connecting this clutch pulley with a sheave 47 secured to the end of the drive shaft forwardly of service pulley 48 already provided. Pulley 48 drives generator 49 by means of a belt 50. Transmission parts are schematically represented at 51 (FIG. 6) and 52 (FIG. 7). The usual carburetor air cleaner 53 is mounted above and rearwardly of air heater casing 54. Fresh air hose 55 is repositioned on casing 54 by means of an adapter fitting 56 so as to clear the space above bracket 41 in which the compressor is mounted. The compressor and its mounting structure are shown in solid lines, but exploded relationship, in FIG. 6, while standard engine parts are shown in dotted lines for clarity. The parts shown in FIG. 6 in themselves do not constitute the present invention, except as covered in the claims.

An important feature of the present invention is the evaporator-condenser unit, generally designated 60, of longitudinal and transverse dimensions to fit conveniently in the space 29 behind rear seat back 27 and to rest on flooring 30. The unit is approximately one 5¾ inches in height and is strongly built so as to occupy a minimum of this space while withstanding the weight of articles which may be piled thereon, such as brief cases and the like. The elevated flooring 30 is provided with a rectangular cutout 61 at one end, approximately 14 inches × 20 inches in area. An air box 62 depends from the underside of flooring 30, and a deflector 63 extends downwardly and forwardly from the rear wall of the box. Deflector 63 and box 62 clear transmission and framing elements schematically represented at 52 and 66 and assist in directing fresh air into heat exchanger 67, during travel of the vehicle, as will be explained. The deflector also prevents the recirculation of outside air which is discharged out the opening 131. In addition, a drainage nipple 68 depends from the portion of unit 60 at the left side of a partial transverse partition 69 therein having an end flange 70 defining a space 71 between the same and upstanding casing wall 72. The casing also includes side and end walls 73, 74, and 75, a bottom ledge 76 at one side of partition 69, and a top 77.

Figure 2:
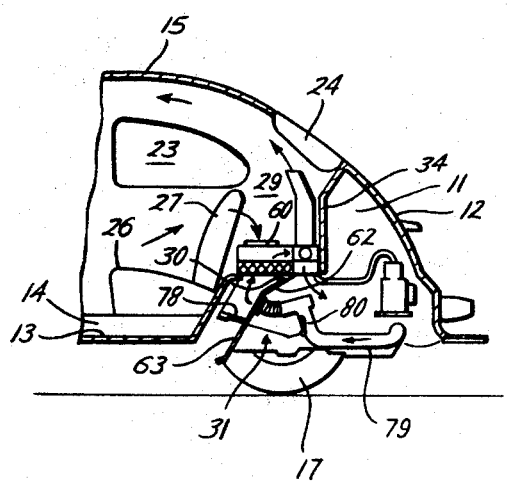
FIG. 2 is a similar view showing the rear part only of the vehicle in condition for heating.
Figure 4:
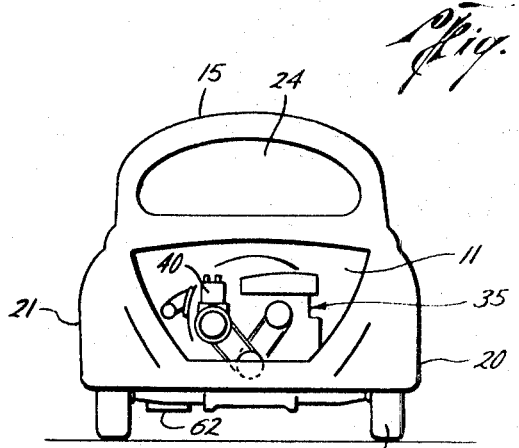
FIG. 4 is a rear view of the car with the engine compartment door removed.
Figure 3:
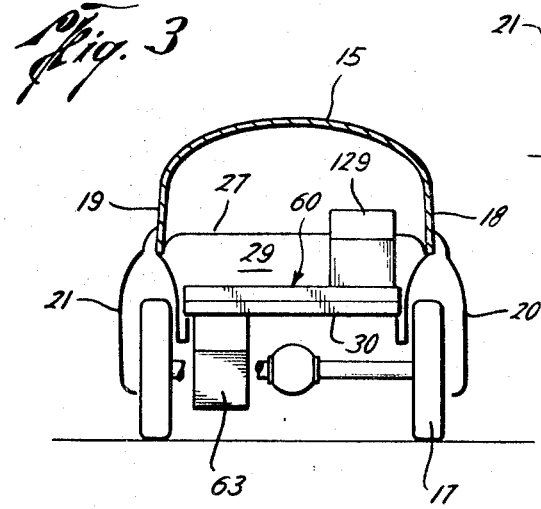
FIG. 3 is a vertical transverse section taken substantially on the corresponding section line of FIG. 1.

Air box 62 mounts a pivoted flap 78 which, when closed, as in FIGS. 2 and 7, forms the bottom wall of the box to exclude outside air therefrom. When the flap is open (FIG. 1), outside air is directed through the box into the heat exchanger 67 as will be explained. A hot air duct 79 leads from a source of engine heat, as the engine heater tubes or radiator, where provided, to the air box and is equipped with a control valve 80. Valves 78 and 80 may be jointly or individually actuated.

The space at the left side of partition 69 in unit 60 receives the heat exchanger coil structure 81 with connected tubing 82 and 83. Tubing 82 leads to one controlled return port 84 of a four-way refrigerant reversing valve 85 (FIGS. 7—11). Tubing 83 leads through a three-way coupling 86 having other tubing branches 87 and 88. Branch 88 leads through an expansion valve 89 and tubing 90 to a three-way fitting 91 (FIGS. 8, 9, and 10) having other branches 92 and 93. Branch 93 leads through sight glass 94 to the receiver-drier 95. Branch 92 extends through a second expansion valve 96, tube 97 and a three-way fitting 98 to a tube 99 extending between one controlled port of a double check valve 100 and an end of coil 67. The other controlled port of double check valve 100 connects to previously mentioned tubing 87. The common port of double check valve 100 is connected through tubing 101 with drier 102, thence, through tubing 103 to the receiver 95. Lines 104 and 105 connect the compressor 40, respectively, with common pressure port 107 of reversing valve 85 and, through the receiver-drier 95 and tubing 110, with common suction port 108 of the reversing valve. The other controlled suction port 109 is connected by tubing 111 to coil 67. Reversing valve 85 is actuated as from the console 37 by means of a solenoid 112.

Figure 10:
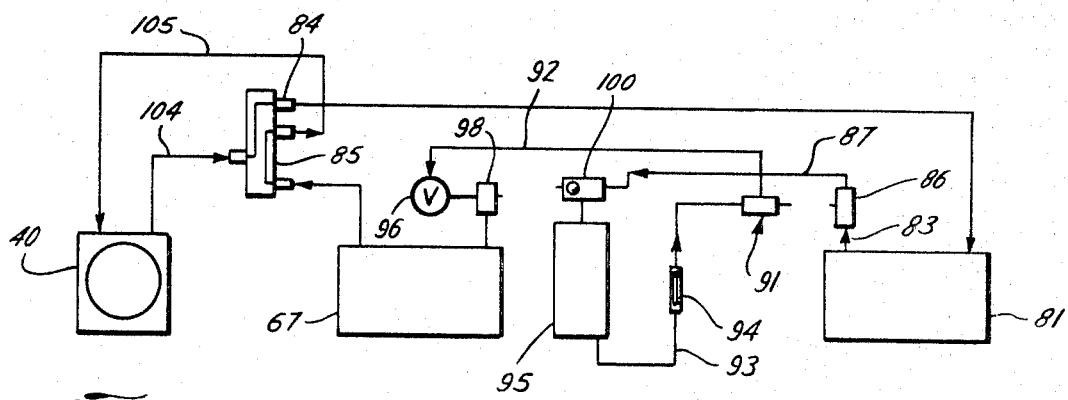

During the heating mode, as in FIGS. 2 and 10, the compressor-pressured heat exchange fluid flows first to coil 81, which acts as the condenser and is hot, then, in order, through the receiver-drier 95, expansion valve 96, relatively cold evaporator coil 67, and back to the compressor. Shutter valve 80 will be open and flap 78 closed so that warm air from the engine will improve the evaporating action and, therefore, the efficiency of the cycle. As will be explained, air within the vehicle body will circulate over and be heated by warm coil 81. During the cooling mode (FIGS. 1 and 9), fluid from the compressor will flow directly to coil 67 for condensation and dissipation of heat to the outside atmosphere, shutter 80 being closed and outside air being directed through chute 62 for cooling the condensing coil. The fluid then flows through the receiver-drier to expansion valve 89 and the now cool evaporator coil 81 back to the compressor. The vehicle body air will now be cooled.

Referring again to FIG. 7, at the right side of partition 69 in cased unit 60 there is mounted the coil unit 67 and a tangential blower 115 with operating motor 116. Slightly elevated above coil 115 are the receiver 95 and drier 102 and high-pressure control 117. Tubes 104 and 105 terminate in fittings 118 and 119 for connection to hoses or tubes 120 and 121 (FIG. 5) having quick connect check-valve-type couplings 122 and 123 at their remote ends for attachment to compressor fittings 124 and 125.

Casing cover 77 is provided at the left side of partition 69 with a screened inlet opening 126 for directing return air from the vehicle body across the body air conditioner coil 81 and into blower 128, thence through an upwardly projecting nozzle structure 129 which registers with a discharge opening 130 in the casing cover. The casing of unit 60 at the right side of partition 69 registers with flooring cutout 61. Coil 67 is located above and exposed to chute 62 so as to receive cooling or heated air therethrough. This air is additionally impelled by means of blower 115 and then is discharged outwardly through the cutout portion 131 for return to the atmosphere.

Many of the mentioned parts, which are more or less conventional units of a reversible mechanical heat pump system, are compactly and firmly housed in the unit casing and may be precharged for convenient installation. This evaporator-condenser unit, as explained, rests upon the prepared flooring 30 behind rear seat back 27. The wiring for the blower motors and the thermostats extends to a terminal plug 135 in the wall 73 of the casing for connection by means of a complementary plug device 136 and harness or cable 137 extending to control console 37 which incorporates thermostat and motor switch controls as 138 and 139. The cable, preferably, extends along tunnel 14 and beneath the floormat. Refrigerant tubes 120 and 121 extend rearwardly into the engine compartment to compressor 102 to complete the installation.

FIG. 1 schematically represents the flow of conditioned air through the vehicle body. The discharge of air from nozzle 129 travels along the streamlined undersurface of roof 15, as indicated by arrows 141, to the forward passenger compartment. The airstream, ultimately, is directed reversely by the forward wall structure 32, 33 to encompass the driver and passenger on the front seat and between and/or over seat back 25 to the rear passenger compartment, thence over rear seat back 27 and into screened inlet 126 for recontact with the coil 81 in the usual manner. Condensate from the latter coil drops out through drain nipple 68. At the same time, the fluid medium is circulated in the usual manner through the compressor 40, one of the coils 67 and 81, receiver 95, and one or the other of the expansion valves 89 or 96 as determined by the position of reversing valve 85.

It is believed the construction, installation, and operation of the novel air-conditioning system will be evident from the preceding description. The incorporation of the condenser, evaporation, and refrigeration components into a single compact unit with convenient electrical and tubular connections greatly simplifies installation, such installation being as simple as installation, for instance, of the radio, and time and cost of installation being reduced by as much as 75 percent over previous units for the same purpose, The underdash evaporator is eliminated for greater convenience, safety, and improved air distribution. All condensers, hoses, and other connections are removed from exposure exteriorly of the vehicle to eliminate the possibility of road damage and to improve performance. In particular, the laminar airflow in the body results in markedly improved volume and distribution of conditioned air. Advantage is taken of the generally streamlined roof for initially directing the conditioned air to the passenger compartments, this stream being sufficiently above the heads of both front and rear seat passengers not to disturb them and yet the high volume movement of return air from front to back quickly cools or heats the entire vehicle. Present underdash evaporators circulate most of the air in the front seat area only, because of blocking by the new high-back seats. Furthermore, no moisture can blow out of the air duct nozzle 129 onto the passengers since the blower is located between the coil 81 and the air duct. The control console is mounted on the flooring tunnel in convenient position adjacent to the gearshift lever. Flush knobs on the console control both fan speed and temperature.

The invention may be modified in various respects as will occur to those skilled in the art.

I claim:

1. The combination with a vehicle having a rear engine compartment, a passenger compartment, a dividing wall structure therebetween including a floor portion defining open space there beneath, a transverse seat spaced forwardly from said wall structure, and a utility compartment between said wall structure and said seat, of a compact air-conditioning unit resting on said floor portion including segregated condenser and evaporator devices and an expansion valve, piping connecting said devices and said valve, and blower means for drawing air from the lower portion of said passenger compartment across said evaporator device and forcing said air into the upper portion of said passenger compartment, there being first and second openings in said wall structure adjacent and communicating with said condenser and spaced apart longitudinally of the vehicle, and air deflector means projecting downwardly and forwardly from the rear edge of said first opening into said open space, said second opening communicating with said open space rearwardly of said deflector means whereby cooling air is directed by said deflector means across said condenser device and is prevented by said deflector means from recirculating across said condenser device.

2. The combination described in claim 1 in which the inlet of said blower means is positioned adjacent the lower part of said passenger compartment and the outlet thereof opens into the upper part of said passenger compartment for causing circulation of conditioned air through said passenger compartment.

3. The combination described in claim 1 further including second blower means disposed to draw cooling air from said open space in front of said deflector means across said condenser device, thence to discharge said cooling air into said open space rearwardly of said deflector means.